United States Patent
Patel et al.

(10) Patent No.: US 10,491,807 B2
(45) Date of Patent: Nov. 26, 2019

(54) METHOD TO USE VEHICLE INFORMATION AND SENSORS FOR PHOTOGRAPHY AND VIDEO VIEWING RECORDING

(71) Applicant: GM Global Technology Operations LLC, Detroit, MI (US)

(72) Inventors: Shiv G. Patel, Toronto (CA); Grant L. Meade, Whitby (CA); Ephraim C. Yuen, Markham (CA); Michael A. Wuergler, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 15/634,669

(22) Filed: Jun. 27, 2017

(65) Prior Publication Data

US 2018/0376054 A1 Dec. 27, 2018

(51) Int. Cl.
*H04N 5/232* (2006.01)
*H04N 7/18* (2006.01)
*H04N 5/247* (2006.01)

(52) U.S. Cl.
CPC ......... *H04N 5/23216* (2013.01); *H04N 5/232* (2013.01); *H04N 5/247* (2013.01); *H04N 7/183* (2013.01)

(58) Field of Classification Search
CPC ...... H04N 7/18; H04N 7/183; H04N 5/23238; H04N 13/0239
USPC ....... 348/148, 143, 147, 169, 170, 171, 172, 348/345, 42, 47, 48, 49, 50; 364/484, 364/485, 605; 701/15, 28
See application file for complete search history.

(56) References Cited

U.S. PATENT DOCUMENTS

| | | | |
|---|---|---|---|
| 5,432,700 A | 7/1995 | Hrovat | |
| 6,130,706 A * | 10/2000 | Hart, Jr. | B60T 8/172 348/148 |
| 6,396,397 B1 * | 5/2002 | Bos | B60N 2/002 340/461 |
| 6,535,242 B1 * | 3/2003 | Strumolo | B60R 11/04 348/148 |
| 8,676,508 B2 | 3/2014 | Schwarz | |
| 9,849,864 B2 * | 12/2017 | Bales | B60T 8/1708 |
| 9,902,229 B2 | 2/2018 | Mettrick et al. | |
| 9,937,923 B2 * | 4/2018 | Custer | G08G 1/015 |
| 2002/0087253 A1 * | 7/2002 | Jeon | G06K 9/00798 701/93 |
| 2004/0227840 A1 * | 11/2004 | Houlberg | H04N 5/23203 348/345 |
| 2004/0249545 A1 | 12/2004 | Lu | |
| 2005/0080543 A1 | 4/2005 | Lu | |
| 2006/0215020 A1 * | 9/2006 | Mori | B60R 1/00 348/119 |

(Continued)

OTHER PUBLICATIONS

U.S. Appl. No. 15/048,502, filed Feb. 19, 2016, Mettrick et al.

*Primary Examiner* — Jefferey F Harold
*Assistant Examiner* — Mustafizur Rahman

(57) ABSTRACT

A camera control system of a vehicle comprises a plurality of sensors configured to determine vehicle data and a camera control module configured to receive the vehicle data from the plurality of sensors. The camera control module is further configured to one of: i) adjust at least one operating parameter of the camera based on vehicle movement data received from the plurality of sensors; or ii) adjust at least one operating parameter of the camera based on light level data received from the plurality of sensors.

20 Claims, 5 Drawing Sheets

(56) References Cited

U.S. PATENT DOCUMENTS

| | | | |
|---|---|---|---|
| 2008/0187047 A1* | 8/2008 | Stephan | H04N 19/61 375/240.16 |
| 2009/0273674 A1* | 11/2009 | Russ | B60R 1/00 348/148 |
| 2010/0152969 A1 | 6/2010 | Li et al. | |
| 2010/0165323 A1* | 7/2010 | Fiess | G01S 17/42 356/5.01 |
| 2011/0050886 A1* | 3/2011 | Thompson | B60R 1/00 348/135 |
| 2012/0203428 A1 | 8/2012 | Choi | |
| 2012/0224059 A1* | 9/2012 | Takamatsu | B60R 1/00 348/148 |
| 2012/0320211 A1* | 12/2012 | Mitsugi | G06T 3/00 348/148 |
| 2013/0038734 A1* | 2/2013 | Furukawa | H04N 7/18 348/148 |
| 2013/0103259 A1 | 4/2013 | Eng et al. | |
| 2013/0314503 A1* | 11/2013 | Nix | G06K 9/00805 348/46 |
| 2014/0072028 A1* | 3/2014 | Bose | H04N 19/507 375/240.01 |
| 2014/0195112 A1 | 7/2014 | Lu | |
| 2015/0035985 A1* | 2/2015 | Conneely | B60R 1/002 348/148 |
| 2015/0061856 A1* | 3/2015 | Raman | G08B 21/24 340/457 |
| 2015/0199019 A1* | 7/2015 | Steers | G06F 3/017 348/148 |
| 2015/0202939 A1 | 7/2015 | Stettner | |
| 2015/0278615 A1* | 10/2015 | Ogawa | G06K 9/00818 348/148 |
| 2016/0137126 A1* | 5/2016 | Fursich | B60R 1/00 348/38 |
| 2016/0167582 A1* | 6/2016 | Chen | G06K 9/00798 348/148 |
| 2016/0178802 A1* | 6/2016 | Stainvas Olshansky | G01S 17/95 356/341 |
| 2017/0106855 A1 | 4/2017 | Lavoie | |
| 2018/0131865 A1* | 5/2018 | Bisti | H04N 5/23216 |

* cited by examiner

METHOD TO USE VEHICLE INFORMATION AND SENSORS FOR PHOTOGRAPHY AND VIDEO VIEWING RECORDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and more particularly to systems and methods for controlling one or more cameras of a vehicle.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

The display of an infotainment system may be used to view still images or video images that are captured by the one or more cameras of the vehicle. The still images or video images may be sent to the display by an automated process or in response to user input commands.

SUMMARY

A camera control system of a vehicle comprises a plurality of sensors configured to determine vehicle data and a camera control module configured to receive the vehicle data from the plurality of sensors. The camera control module is further configured to one of: i) adjust at least one operating parameter of the camera based on vehicle movement data received from the plurality of sensors; or ii) adjust at least one operating parameter of the camera based on light level data received from the plurality of sensors.

In other features, the at least one operating parameter comprises an ISO parameter of the camera. In other features, the at least one operating parameter comprises an F-Stop parameter of the camera. In other features, the at least one operating parameter comprises a shutter speed parameter of the camera. In other features, the at least one operating parameter comprises a focus parameter of the camera. In other features, the at least one operating parameter comprises a frame rate parameter of the camera.

In other features, the vehicle movement data comprises road preview data associated with a road in front of the vehicle. In other features, the vehicle movement data comprises at least one of vehicle velocity, vehicle acceleration, vehicle roll, vehicle pitch, and vehicle heave.

In other features, the light level data comprises ambient light data. In other features, the light level data comprises at least one of GPS location data, direction data, azimuth of the sun data, forward lighting system status data, and gear selection data.

In other features, a camera control system of a vehicle comprises a plurality of sensors configured to determine vehicle data and a camera control module configured to receive the vehicle data from the plurality of sensors. The camera control module is further configured to: i) adjust at least one operating parameter of the camera based on vehicle movement data received from the plurality of sensors; and ii) adjust at least one operating parameter of the camera based on light level data received from the plurality of sensors. The camera control module may adjust i) the at least one operating parameter of the camera based on vehicle movement data and ii) at least one operating parameter of the camera based on light level data in parallel or in series with each other.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The vehicle camera control module disclosed herein enhances image quality for vehicle viewing applications (e.g., performance camera, rear vision camera, 360-degree surround view, rear camera mirror, and the like). By consuming and reusing vehicle information and the data from vehicle sensors (e.g., ambient light, vehicle speed, wiper information) and additional information from forward cameras used for active safety features (e.g., low/high sun, windshield smudges/smears, road preview information), the disclosed camera control module may be configured to adjust the operating parameters of one or more vehicle cameras in order to improve image quality of both still photographs and video streams. The operating parameters of the cameras) may be adjusted to provide, for example, improved lighting compensation and image stabilization.

By incorporating the forwarding looking sensors to determine an upcoming road profile, the camera control module improves image stabilization. Using other vehicle information, the camera control module may adjust camera operating parameters (or settings), such as ISO, shutter speed, F-stop, frame rate, and image stabilization, based on the driving conditions to improve image quality for viewing features.

Taking pictures with a low shutter time is desirable in low lighting conditions and for taking higher quality pictures. However, camera shake prevents the camera from running at lower frame rates. But, if the road profile in front of the vehicle is known, the road profile may be used as an input into the camera image stabilization control module. In some embodiments, a reference vehicle model may be used to determine the vehicle response over an upcoming road profile or event.

Vehicle information may include body motion quantities, such as: i) roll, pitch, heave; ii) roll, pitch, and heave (rates); iii) roll, heave, pitch (acceleration); iv) suspension travel; v) suspension velocity; and vi) suspension acceleration. The vehicle information may be sent to the camera image stabilization control module. The vehicle information may also limit shutter time exposure if a road event can impact image quality. This is a low cost solution to add image stabilization, as current automotive cameras do not have an accelerometer for image stabilization.

The disclosed camera control module may produce an optimal image with the use of vehicle information and sensors that a typical camera would not have. This may be accomplished by continuously (or periodically) updating camera parameters; that is, by auto-adjusting ISO, shutter speed, frame rate, and F-Stop based upon vehicle information and sensors (vehicle speed, accelerometer, GPS, rain sensor). The camera control module may execute a method that accounts for azimuth of the sun (determined by GPS and time of day) to drive ISO and/or F-Stop settings to optimize focus or suggest better angle to take a picture or suggest a location for the same view.

Figure 1:
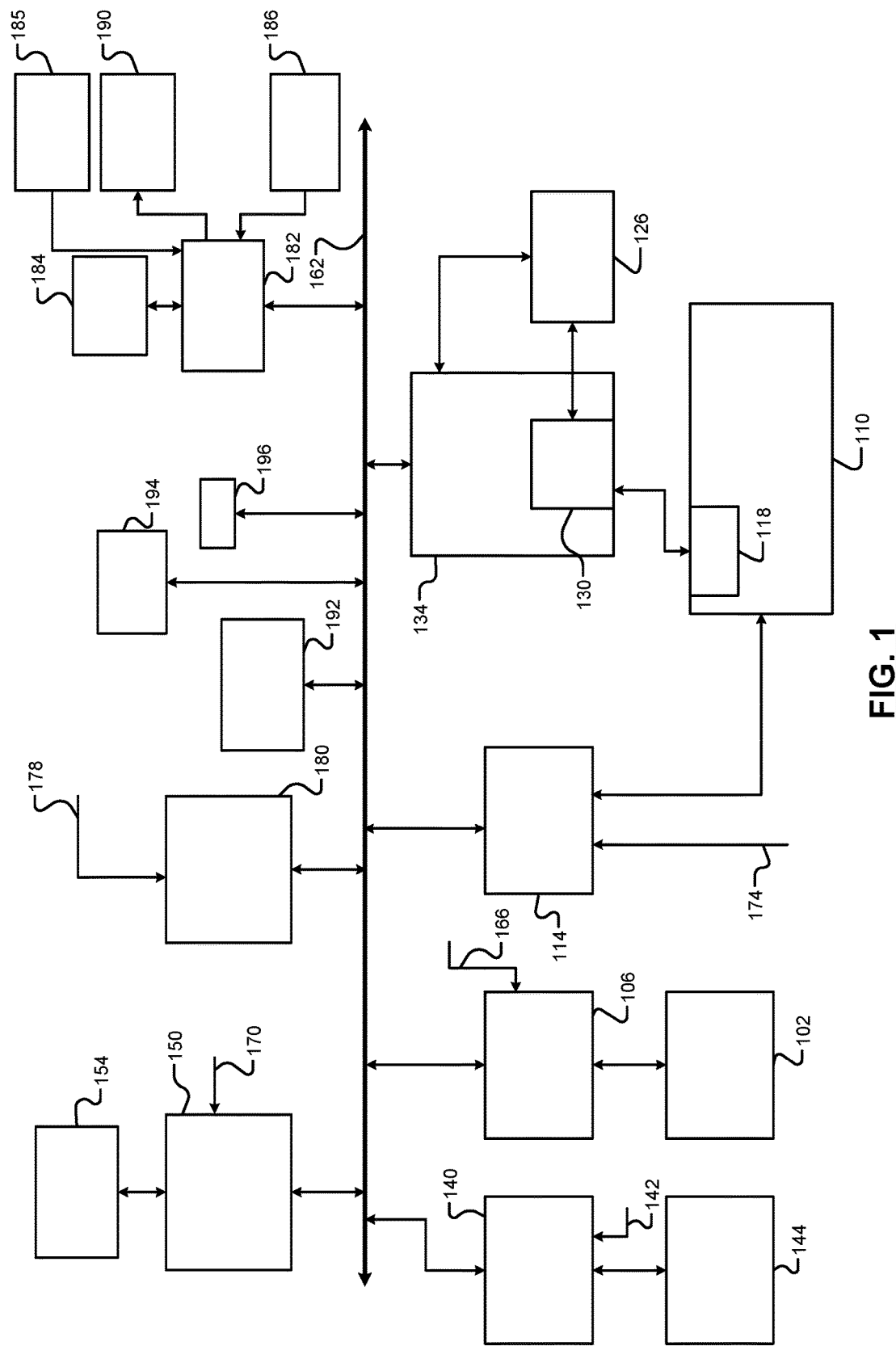
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a "car area network". For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an infotainment module 182. The infotainment module 182 controls what is displayed on a display 184. The display 184 may be a touchscreen display in various implementations and transmit signals indicative of user input to the display 184 to infotainment module 182. Infotainment module 182 may additionally or alternatively receive signals indicative of user input from one or more other user input devices 185, such as one or more switches, buttons, knobs, etc.

Infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186. External sensors and cameras 186 may include the cameras described below in FIG. 2. External sensors and cameras 186 may also include vehicle sensors, including ambient light sensor 194 (shown separately), GPS receiver 196 (shown separately), speedometers, accelerometers, gyros, compass, radar and/or LiDAR systems, rain/wiper sensors, among other sensors. These external sensors and cameras 186 detect or determine ambient light, vehicle speed, vehicle acceleration, vehicle roll, vehicle pitch, vehicle heave, rain status, GPS position and elevation data, and road profile information. At least some of the external sensor and camera information may be transmitted to infotainment module 182 via controller area network (CAN) 162.

Infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

The vehicle system also includes a camera control module 192 that controls the operating parameters of the cameras of the vehicle using light compensation and image stabilization functions. The camera control module 192 enhances image quality for vehicle viewing applications and reuses vehicle information and data from vehicle sensors (e.g., ambient light, vehicle speed, wiper information, low/high sun, windshield smudge, road preview information). The camera control module 192 may be configured to adjust the operating parameters of one or more vehicle cameras in order to improve image quality of both still photographs and video streams. The operating parameters of the camera(s) may include, for example, ISO, shutter speed, F-stop, frame rate, and image stabilization and cropping, based on the driving conditions.

Figure 2:
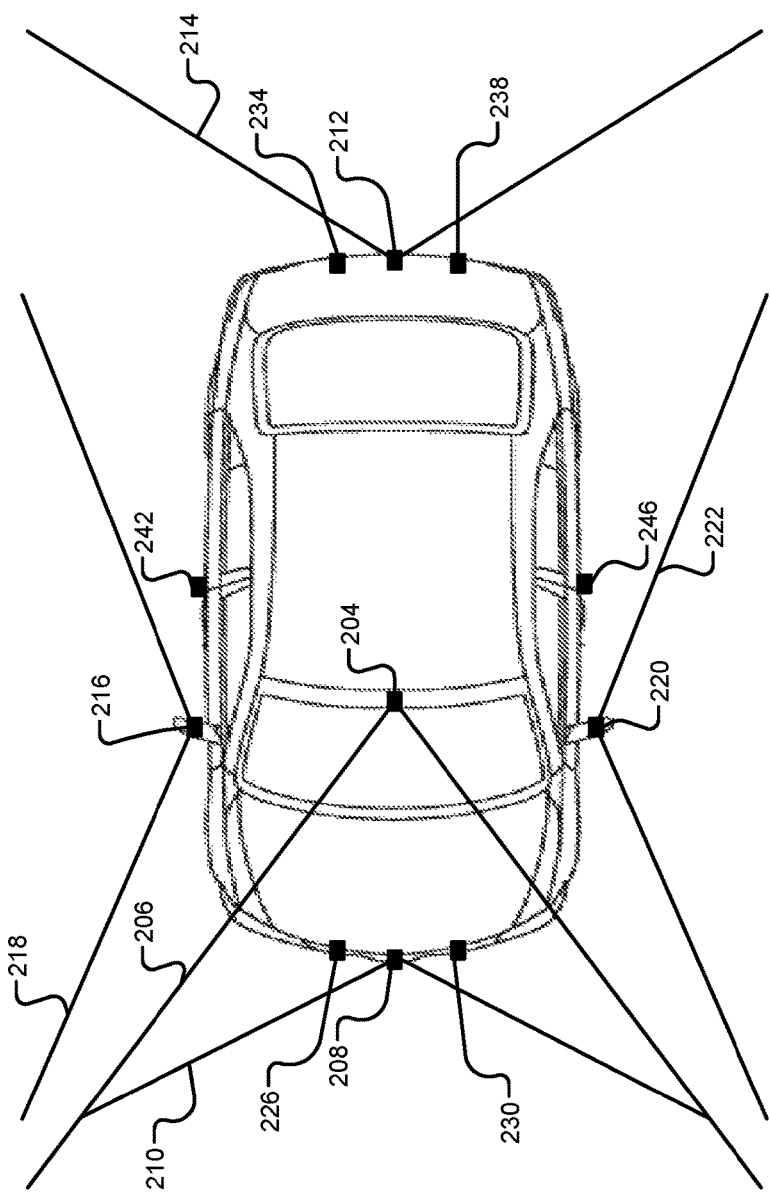
FIG. 2 is a functional block diagram of a vehicle including various cameras.

In FIG. 2, camera control module 192 is shown as a stand-alone module coupled to CAN 162 and that receives vehicle information and sensor data from CAN 162 and transmit and receive camera operating parameters via CAN 162. However, this is merely one exemplary embodiment. In an alternate embodiment, camera control module 192 may be implemented as a sub-module disposed in infotainment module 182. This configuration is efficient and convenient since the still images and video images from the cameras are most likely to be displayed on display 184 associated with vehicle infotainment module 182. However, this configuration is by no means necessary. In still another configuration, the camera control module 192 may be integrated within a vehicle camera and an application programming interface (API) may be provided to interface between the camera control module 192 and the vehicle sensor data.

More generally, any control module in the vehicle, including a stand-alone, special purpose module, may be configured to act as a camera control module 192 that performs the process(es) of updating and adjusting the operating parameters of one or more vehicle cameras. However, for the purpose of simplicity in explaining the disclosed embodiments, it shall be assumed that camera control module 192 is implemented as a stand-alone module coupled to CAN 162.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to the vehicle). For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate. A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as ultrasonic (e.g., radar) sensors. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle. The infotainment module 182 detects objects around the vehicle based on signals from the ultrasonic sensors generated based on signals reflected back by objects around the vehicle.

Under some circumstances, infotainment module 182 may stitch together video from the front camera 208 (and/or the forward facing camera 204), the rear camera 212, the right camera 216, and the left camera 220 to generate surround view video and display the surround view video on the display 184. The surround view video includes video as viewed from above the vehicle (a top view) and includes an image of the vehicle and objects around the vehicle, such as vehicles, markers on the road (e.g., lines, curbs, parking blocks, etc.), humans (e.g., pedestrians, bicyclists, etc.), and other objects near the vehicle. The surround view may also include other information, such as one or more indicators of vehicle trajectory.

Figure 3:
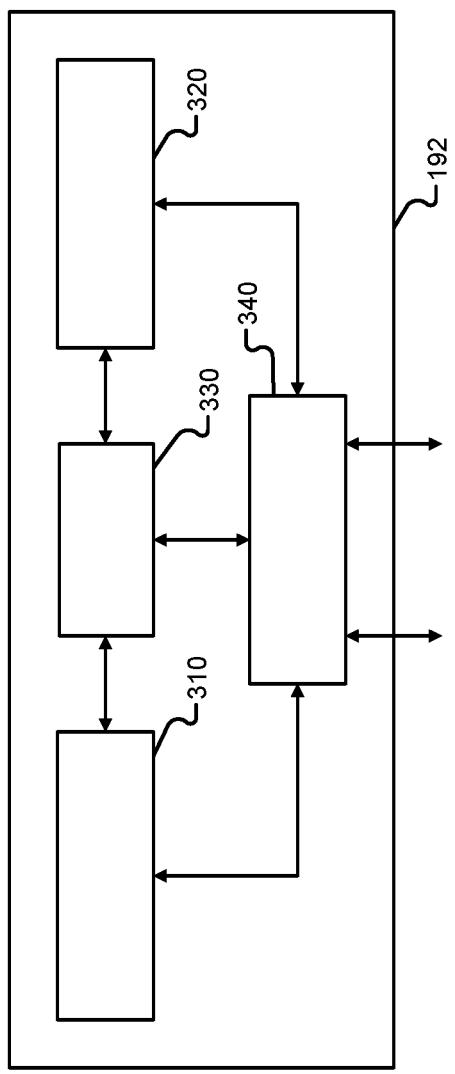
FIG. 3 is functional block diagram in greater detail of the camera control module in FIG. 1.

FIG. 3 is functional block diagram illustrating in greater detail the camera control module 192 in FIG. 1. The camera control module 192 comprises light compensation module 310, image stabilization module 320, calibration tables 330, and operating parameters control module 340. Operating parameters control module 340 communicates via CAN 162 with other modules, cameras, and sensors in the vehicle. Operating parameters control module 340 receives initial (or current) camera operating parameters and vehicle sensor data from CAN 162 and distributes the camera operating parameters and vehicle sensor data to light compensation module 310 and image stabilization module 320. Operating parameters control module 340 may also receive calibration table data for the vehicle cameras and store the calibration table data in calibration tables 330.

Light compensation module 310 executes a light compensation method in order to determine updated (or new) camera operating parameters, as described below in FIG. 4.

Figure 5:
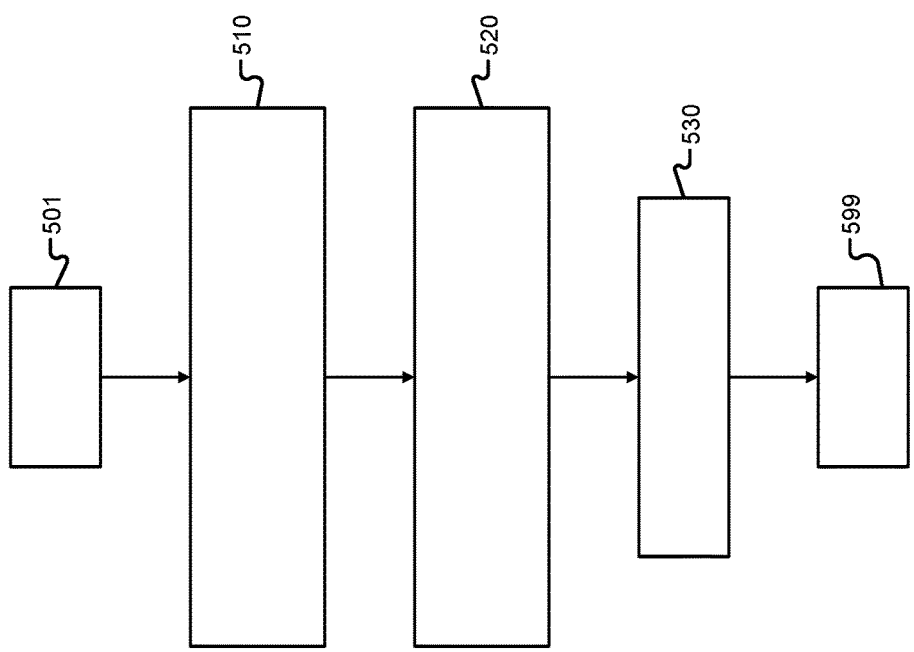
FIG. 5 is a flowchart depicting an example method of using image stabilization to modify camera operating parameters.

Image stabilization module 320 executes an image stabilization method in order to determine updated (or new) camera operating parameters, as described below in FIG. 5. The updated camera operating parameters are then transferred to operating parameters control module 340.

If the light compensation method and the image stabilization method are both executed at the same time and there is a conflict between the updated camera operating parameters determined by light compensation module 310 and image stabilization module 320, the conflict is resolved by operating parameters control module 340 according to priority criteria in operating parameters control module 340. The priority criteria may be established by default in operating parameters control module 340 or may be set (or initialized) by an application that is using the vehicle cameras. The final updated camera operating parameters are then transmitted to one or more vehicle cameras by CAN 162.

Figure 4:
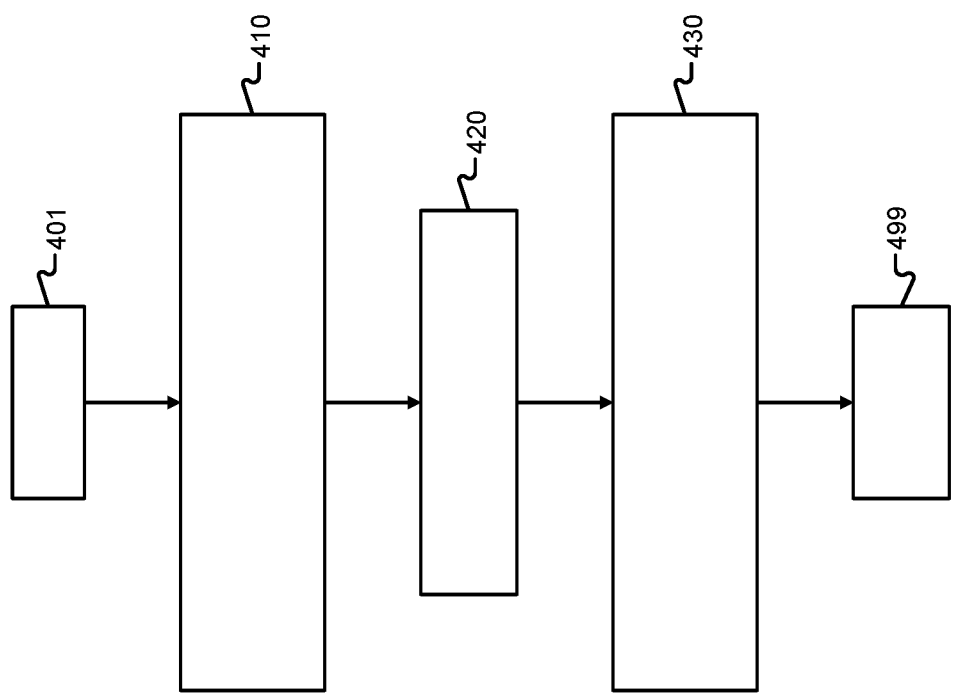
FIG. 4 is a flowchart depicting an example method using light compensation to modify camera operating parameters.

FIG. 4 is a flowchart depicting an example process using light compensation to modify camera operating parameters. FIG. 5 is a flowchart depicting an example process using image stabilization to modify camera operating parameters. Camera control module 192 is configured to perform one or both of the lighting compensation process in FIG. 4 and the image stabilization process in FIG. 5 in order to adjust or modify initial camera parameters associated with at least one vehicle camera to thereby generate updated camera parameters. The lighting compensation process and the image stabilization process may be executed as parallel processes or as serial processes.

In 401, light compensation module 310 receives initial camera parameters 401. In 410, light compensation module 310 also receives vehicle data from vehicle sensors (e.g., azimuth of sun, GPS location, time, and elevation, heading/direction, ambient light data, forward lighting system status, gear selection, and the like). Headlamps may cause additional compensation for forward facing cameras (204 and 208) and reversing lamps (indicated through gear selection) may cause additional compensation for rear facing cameras (212). In 420, light compensation module 310 determines the light level from one or more of these data. Next, in 430, light compensation module 310 determines the updated (or new) camera operating parameters (e.g., F-Stop, ISO, shutter speed, etc.) of at least one vehicle camera using calibration tables 330 and the received vehicle data. Light compensation module 310 may adjust, for example, F-Stop, ISO, and shutter speed parameters to compensate for changes in light conditions, such as when the vehicle enters a tunnel. In an exemplary embodiment, light compensation module 310 may use calibration tables 330 to adjust F-Stop, ISO, shutter speed and other parameters in an iterative loop. Finally, the updated camera parameters 499 are transmitted to camera parameters control module 340.

In 501, image stabilization module 320 receives initial camera parameters 501. In 510, image stabilization module 320 also receives vehicle movement data from vehicle sensors (e.g., road preview data, inertial measurement unit (IMU), vehicle velocity, etc.). Next, in 520, image stabilization module 320 determines updated (or new) parameters (e.g., FPS, shutter speed, focus, etc.) of at least one vehicle camera using calibration tables 330 and the vehicle movement data. Image stabilization module 320 may, for example, adjust frame rate (i.e., frames per second (FPS)), shutter speed, and focus to compensate for changes in anticipated vehicle movement. The road preview data may, for example, indicate the road surface contour (e.g., bumps) in front of the vehicle or a curve in the road in front of the vehicle. In 530, image stabilization module 320 may use the vehicle movement data to perform image frame cropping that produces a cropped frame. Finally, the updated camera parameters 599 are transmitted to camera parameters control module 340.

As noted above, operating parameters control module 340 resolves conflicts between updated camera parameters 499 and updated camera parameters 599 according to priority criteria in operating parameters control module 340.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term "code", as used above, may include software, firmware, and/or microcode, and may refer to programs, routines, functions, classes, data structures, and/or objects. The term "shared processor circuit" encompasses a single processor circuit that executes some or all code from multiple modules. The term "group processor circuit" encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term "shared memory circuit" encompasses a single memory circuit that stores some or all code from multiple modules. The term "group memory circuit" encompasses a memory circuit that, in combination with additional memories, stores some or all code from one or more modules.

The term "memory circuit" is a subset of the term "computer-readable medium". The term "computer-readable medium", as used herein, does not encompass transitory electrical or electromagnetic signals propagating through a medium (such as on a carrier wave); the term "computer-readable medium" may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A camera control system of a vehicle comprising:
a plurality of vehicle sensors configured to determine vehicle data; and
a camera control module disposed in the vehicle and configured to receive the vehicle data from the plurality of vehicle sensors, wherein the camera control module is further configured to one of:
adjust in real time at least one operating parameter of a camera disposed in the vehicle based on vehicle movement data received from the plurality of vehicle sensors; or
adjust in real time at least one operating parameter of the camera based on light level data received from the plurality of vehicle sensors,
wherein the plurality of vehicle sensors are separate from the camera.

2. The camera control system of claim 1, wherein the at least one operating parameter comprises an ISO parameter of the camera.

3. The camera control system of claim 1, wherein the at least one operating parameter comprises an F-Stop parameter of the camera.

4. The camera control system of claim 1, wherein the at least one operating parameter comprises a shutter speed parameter of the camera.

5. The camera control system of claim 1, wherein the at least one operating parameter comprises a focus parameter of the camera.

6. The camera control system of claim 1, wherein the at least one operating parameter comprises a frame rate parameter of the camera.

7. The camera control system of claim 1, wherein the vehicle movement data comprises road preview data associated with a road in front of the vehicle.

8. The camera control system of claim 1, wherein the vehicle movement data comprises at least one of vehicle velocity, vehicle acceleration, vehicle roll, vehicle pitch, and vehicle heave.

9. The camera control system of claim 1, wherein the light level data comprises ambient light data.

10. The camera control system of claim 1, wherein the light level data comprises at least one of GPS location data, direction data, azimuth of the sun data, forward lighting system status data, and gear selection data.

11. A camera control system of a vehicle comprising:
a plurality of vehicle sensors configured to determine vehicle data; and
a camera control module disposed in the vehicle and configured to receive the vehicle data from the plurality of vehicle sensors, wherein the camera control module is further configured to:
adjust in real time at least one operating parameter of a camera disposed in the vehicle based on vehicle movement data received from the plurality of vehicle sensors; and
adjust in real time at least one operating parameter of the camera based on light level data received from the plurality of vehicle sensors,
wherein the plurality of vehicle sensors are separate from the camera and wherein the camera control module may adjust i) the at least one operating parameter of the camera based on vehicle movement data and ii) at least one operating parameter of the camera based on light level data in parallel or in series with each other.

12. The camera control system of claim 11, wherein the light level data comprises at least one of GPS location data, direction data, azimuth of the sun data, forward lighting system status data, and gear selection data.

13. The camera control system of claim 11, wherein the light level data comprises ambient light data.

14. The camera control system of claim 13, wherein the at least one operating parameter comprises an ISO parameter of the camera.

15. The camera control system of claim 13, wherein the at least one operating parameter comprises an F-Stop parameter of the camera.

16. The camera control system of claim 13, wherein the at least one operating parameter comprises a shutter speed parameter of the camera.

17. The camera control system of claim 13, wherein the at least one operating parameter comprises a focus parameter of the camera.

18. The camera control system of claim 13, wherein the at least one operating parameter comprises a frame rate parameter of the camera.

19. The camera control system of claim 13, wherein the vehicle movement data comprises road preview data associated with a road in front of the vehicle.

20. The camera control system of claim 13, wherein the vehicle movement data comprises at least one of vehicle velocity, vehicle acceleration, vehicle roll, vehicle pitch, and vehicle heave.

* * * * *